United States Patent [19]

Hirasuna et al.

[11] Patent Number: 4,537,406
[45] Date of Patent: Aug. 27, 1985

[54] HOSTILE ENVIRONMENT JOINT SEAL AND METHOD FOR INSTALLATION

[75] Inventors: Alan R. Hirasuna, Newport Beach; Gordon R. Veal, Mission Viejo, both of Calif.

[73] Assignee: L'Garde, Inc., Newport Beach, Calif.

[21] Appl. No.: 489,244

[22] Filed: Apr. 27, 1983

[51] Int. Cl.³ .............................................. F16L 33/24
[52] U.S. Cl. ........................................ 277/1; 277/190; 277/189; 277/237 R
[58] Field of Search ................... 277/237 A, 236, 185, 277/189, 190, 191, DIG. 6, 1

[56] References Cited

U.S. PATENT DOCUMENTS

| | | |
|---|---|---|
| 3,382,563 | 5/1968 | Barroil et al. |
| 3,443,817 | 5/1969 | Reiling |
| 3,458,220 | 7/1969 | Rose et al. ............... 277/236 |
| 3,572,735 | 3/1971 | Dryer |
| 3,649,032 | 3/1972 | Nelson |
| 3,759,552 | 9/1973 | Levinsohn et al. |
| 4,001,928 | 1/1977 | Schweiso |
| 4,141,576 | 2/1979 | Lupke et al. |
| 4,149,911 | 4/1979 | Clabburn |
| 4,198,081 | 4/1980 | Harrison et al. |
| 4,281,841 | 8/1981 | Kim et al. ............... 277/236 |
| 4,304,613 | 12/1981 | Wang et al. |
| 4,428,590 | 1/1984 | Pippert et al. .......... 277/185 |
| 4,480,841 | 11/1984 | Schokel et al. .......... 277/1 |

OTHER PUBLICATIONS

Jackson et al., 55 Nitinol—The Alloy With A Memory: Its Physical Metallurgy, Properties, and Applications, Nasa-SP 5110, 1972.
Raychem Corp., Cryofit—The Better Way to Join Pipes, 1979.
Goldstein, A Source Manual for Information on Nitinol and NiTi, Naval Surface Weapons Center, NSWC TR 80-59, 1980.

Primary Examiner—Robert I. Smith
Attorney, Agent, or Firm—Knobbe, Martens, Olson & Bear

[57] ABSTRACT

A tubular joint sealing system for use in high pressure and high temperature conditions is provided. The sealing system consists of a shape memory material backup member combined with a compliant seal. The shape memory member is deformed into an intermediate shape that is sufficiently reduced in size so as to avoid abrasive contact with the sealing surfaces of the tubular members during the mechanical makeup of the joint. Thereafter, the shape memory member may be activated to assume its memory shape configuration, which is selected to be sufficient size to form a pressure and fluid-tight seal.

44 Claims, 11 Drawing Figures

HOSTILE ENVIRONMENT JOINT SEAL AND METHOD FOR INSTALLATION

BACKGROUND OF THE INVENTION

1. Field Of The Invention

The present invention relates to a joint seal for use in high pressure and high temperature conditions, and more particularly to such a seal system fabricated out of a metal alloy having shape memory characteristics in combination with a compliant seal, which permits seating of the seal system after the mechanical makeup or connection has been fully completed.

2. Description Of The Prior Art

The exploration for and extraction of natural gas has in some instances presented problems not commonly associated with other types of oil and gas wells. Extremely high temperatures and especially high pressures associated with the deeper gas wells present various problems that could not have even been imagined by the earlier drillers of the more shallow oil and gas wells. However, with the exhaustion of the more easily recoverable oil and gas, it has become necessary to drill deeper into the earth, seeking replacement supplies of these vital commodities. The hostile conditions present at these greater depths are constantly challenging metallurgists and petroleum engineers to develop new systems capable of performing under these conditions.

The drilling method historically employed by the petroleum industry for the drilling of exploratory and producing wells utilizes a drill bit attached to a rotating string of drilling pipe. Rotation is induced by a rotary table located on the surface, which is engaged with the string of pipe by a special, uppermost section of drilling pipe, or Kelly. As the drill bit bores into the earth, at rates often averaging about five feet per hour (1.5 meters per hour) in deep holes, additional sections of drilling pipe are added from the top. During both the drilling and production, it is vital that connections between the individual lengths of drilling pipe as well as other types of well tubulars, including various kinds of casing, lining, and tubing, also provide gas and fluid-tight seals. Such sealing is necessary to ensure containment during drilling and production of the hazardous high pressures existing in deep gas wells. The difficulties in maintaining these individual seals is made infinitely more complicated by high and widely varying magnitudes of temperature and pressure, and frequently, highly corrosive environments.

In providing pressure-tight joints at ultra-high pressures, whether or not in the oil industry, it is typically not possible to utilize compliant seal material as the primary seal. Under high differential pressures, such material will structurally fail and extrude out through any available opening. For this reason, metal-to-metal seals are provided as the primary seal. Metal seals are created both through the provision of corresponding planar sealing surfaces and through specially designed, tapered threads. Use of a compliant sealing material in these circumstances is limited to the formation of secondary seals, which are created in protected areas located between the metal-to-metal seals. Such metal-to-metal seals have been widely used in the past over varying temperature and pressure conditions, however at increasing temperatures and pressures, These concepts have proven to be unreliable.

Most sealing systems utilize either the application of a preload or the creation of an interference, either of which energizes the seal and creates sealing stresses. Because metals have relatively high modulus and low compliance, relatively high stresses and preloads are required with metal seal systems. Furthermore, stretching of the connection due to weight of the tubular, internal pressure, flexing of the tubular, and differential thermal expansion can cause unloading of the preload, and thus seal failure. To prevent this from occurring, additional, compensating preloading is required. After the sealing surfaces have been brought together during the mechanical formation of the connection, it is necessary to further tighten the members, pressing the sealing surfaces tightly together to preload them sufficiently to form a reliable seal. All of these additional components of preloading increase the stresses and frictional forces in the connection.

Since the mating or sealing surfaces are also part of the mechanical joint system, these surfaces are subjected to rotational sliding, under load, during the mechanical makeup of the joint. In fact, the seals are formed as a result of the two sealing surfaces sliding past one another under increasing stresses. Such a sealing process inevitably creates the potential for damage to the sealing surfaces because of the interference fit. Minimization of the amount of damage caused thereby requires creation of extremely tight tolerances and precise interference fits, which are both expensive to obtain and excessively vulnerable to damage.

The precise interference fits also prevent the effective and reliable use of resilient or compliant materials as the primary seal. Such materials are unable to withstand the strain placed upon them as the tightly confining mating surfaces rotate against them. Bunching, rolling, and/or galling is highly probable, and such destructive deformation is catastrophic to the formation of a viable seal. Even should the material somehow escape damage during the mechanical makeup, it is inevitable that gaps will exist within the threads or between sealing surfaces, and at high pressures, the sealing material will fail by extruding out of its seat and into these gaps. For these reasons, compliant materials, which are the most desirable seal materials, are seldom used in forming such high pressure seals, and even where used, metal-to-metal seals provide the primary sealing means.

SUMMARY OF THE INVENTION

The present invention has as an underlying objective, the improvement in the hertofore known types of high pressure and temperature sealed connections by the provision of a compliant material seal having a metal-to-metal seal backup that is formed only after the tubular connection itself has been mechanically completed. Up until that point, neither the compliant material nor the metal-to-metal backup surfaces have been subjected to mechanical or frictional loading or sliding motion, and thus the sealing surfaces are not subject to damage while the mechanical connection between the tubular members is being formed.

The separate, post-connection formation of the seal substantially eases the design criteria for the connection between members since all of the previous, exacting seal considerations have been substantially removed. The thread and mechanical surface tolerances are not nearly as critical, nor is preloading stress the major design consideration.

These objectives are inventively achieved by providing a separate sealing system constructed of a metallic, shape memory material, and a compliant seal. After first being formed into the required dimensions, the shape memory member is deformed sufficiently to avoid sliding contact with the sealing surfaces during the makeup of the joint connection. After the joint is mechanically completed, the sealing system is then caused to resume its original dimensions, seating itself and forming the seal. As finally formed, the compliant material is enclosed by adjacent metal-to-metal backup, which prevents subsequent extrusion of the compliant material when subjected to high pressures.

This remarkable seal system with the ability to seat itself after the mechanical makeup of the connection is made possible by the inventive utilization of shape memory material. Beginning in the early 1960's, a series of engineering alloys possessing this "memory" became known to metallurgists. The generic name of one series of such alloys is 55-Nitinol, where Nitinol is an acronym of: NIckel TItanium Naval Ordinance Laboratory. These alloys, having chemical compositions in the range of approximately 53 to 57 weight percent nickel, with the balance titanium, possess a memory such that under the proper conditions, an object formed thereof can be restored to its original shape even after permanent deformation. The return to the original or "memory" shape is triggered by heating the alloy to a specific transition temperature, which can be variably selected within the range of −400° to 330° F. (−240° to 165° C.), by adjusting the precise composition of the alloy. Further information concerning Nitinol, its composition, physical properties, and applications may be found in NASA publication No. SP 5110, entitled "55-Nitinol—The Alloy With A Memory: Its Physical Metallurgy, Properties, And Applications", published in 1972 by the U.S. Government Printing Office.

Discovery of Nitinol resulted in the issuance of U.S. Pat. No. 3,174,851 to Buehler et al. A benevolent licensing program by the assignee, the United States Government, has resulted in a number of patents disclosing various ways of utilizing this alloy. These uses range in complexity and importance from self-erectable structures for aerospace hardware to toys and advertising novelties. (See NASA Publication No. SP 5110, supra.) In the area of connectors, however, the variety has been somewhat limited. U.S. Pat. Nos. 4,149,911 and 4,198,081 to Clabburn and Harrison et al., respectively, typify the systems wherein the Nitinol is formed in such a manner that upon reassuming its memory shape, it contracts around the pipes, clamping them together. U.S. Pat. No. 3,759,552 to Levinsohn et al., provides a heat recoverable V-ring seal in addition to the above-mentioned clamping seal.

In Kim et al. (U.S. Pat. No. 4,281,841), an O-ring of Nitinol is utilized for sealing two concentric tubes in an ultra-high vacuum system. Upon heating, the O-ring expands outwardly, deforming to create a seal as a result of ridges formed in the walls of the inner and outer tubes. In another expansion-type seal, U.S. Pat. No. 4,001,928 to Schweiso, a dish-shaped plug of heat recoverable material is placed in an opening, and, upon heating, the plug enlarges to its former "memory" diameter and seals the opening. Additional prior patent and bibliographic information may be found in the Naval Surface Weapons Center Publication No. NSWC TR 80-59, entitled "A Source Manual For Information On Nitinol And Niti, First Revision", by David Goldstein, Feb. 1, 1980 edition.

In contrast to this prior art, the present invention utilizes shape memory metal to provide a backup to a compliant sealing material. In the context of an oil well environment, this is a fundamental difference, as will now be described in conjunction with the type of tubular connection utilizing a cylindrical outer sleeve.

The sealing ring fabricated out of a shape memory metal is provided with compliant sealing material located in grooves formed in both end faces of the alloy ring. Prior to insertion into the sleeve, the sealing ring is radially distorted in a manner that effectively reduces its axial length. The ring is then placed between the two tubular members, which are tightened onto the cylindrical sleeve. After the connection has been mechanically completed, the sealing ring is heated, causing the ring to return to its original axial dimensions, expanding to fill the previously unoccupied spacing gaps between the two tubular members. This axial expansion causes the ridge of compliant sealing material located at each end face to form a seal with the mating surface of the tubular member located adjacent thereto. In addition, the alloy ring material adjacent each side of the compliant material forms a zero clearance backup and, secondarily, a metal-to-metal seal with the end of the tubular member, thus preventing the sealing material from extruding therefrom.

The Nitinol alloy permits the sealing ring to have an initial axial dimension that is sufficiently reduced to avoid any abrasive contact with the sealing surfaces on the tubular member during the tightening operation. The forceful tendency of the sealing ring to return to its original, expanded shape upon heating creates controllable mechanical forces that press the compliant material against the sealing surfaces. A tight, well-formed seal system results, which is suitable for the high temperature and pressure environments commonly associated with the deeper drilling operations. Moreover, the minimal hysteresis losses occurring during the Nitinol phase changes enable the sealing ring to be repeatedly refurbished for the reuse thereof. The many assemblies and disassemblies to tubular members required during oil well drilling and production makes this ability for recycling extraordinarily advantageous. In addition to Nitinol, other shape memory alloys exist and may be utilized in the present invention, such as a family of brasses.

Various other objects, advantages, and features of the present invention will become readily apparent from the ensuing detailed description, and the novel features will be particularly pointed out in the appended claims.

DESCRIPTION OF THE PREFERRED EMBODIMENT

Figure 1:
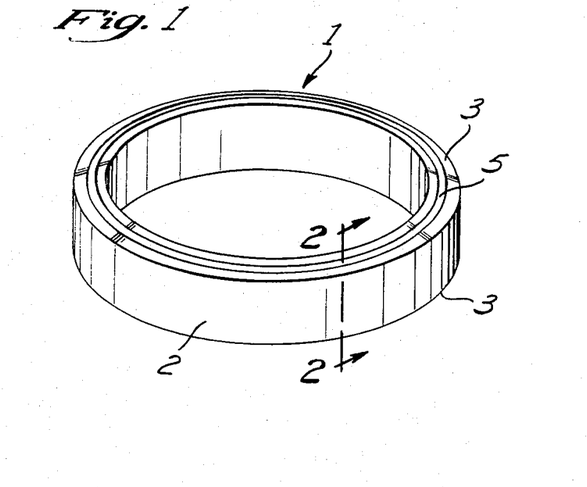
FIG. 1 is a perspective view showing a sealing ring formed out of a shape memory alloy, as viewed from above.

FIG. 1 shows a sealing ring 1 that is used to form a tubular joint seal in accordance with the present invention. The sealing ring 1 consists of a shape memory backup ring 2 with a pair of end faces 3 and a circumferential ridge of a compliant sealing material forming a compliant seal 5 upon each thereof. As more clearly shown in FIG. 2, the compliant seal 5 is located in a pair of grooves 4 that are formed in the end faces 3 of the backup ring 2.

The shape memory material utilized for the backup ring 2 is, in a preferred embodiment, a metal alloy known as Nitinol. The shape memory characteristics of Nitinol have long been well known to those skilled in the art. This alloy of approximately 55% Nickel and 45% Titanium, posseses the ability to be formed into a "memory" shape while in the higher temperature crystaline phase; to be cooled and deformed while in the lower temperature phase (deformation of up to 10%); and then to reassume its original memory shape upon again being warmed into its higher temperature phase. Nitinol alloys suitable for the present invention may be obtained from such suppliers as Special Metals Corp., New Hartford, N.Y., and Raychem Corp., Menlo Park, Calif.

Figure 2:
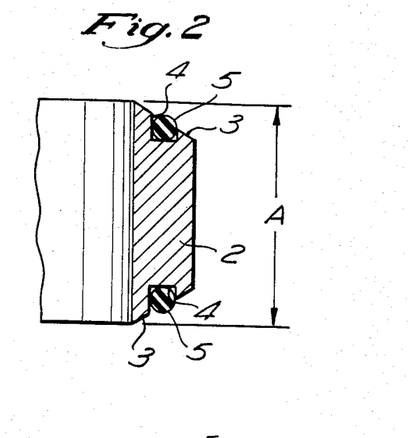
FIG. 2 is an elevational view in section taken along the line 2—2 of FIG. 1, showing a cross-section of a sealing ring according to the present invention, as originally formed.
Figure 3:
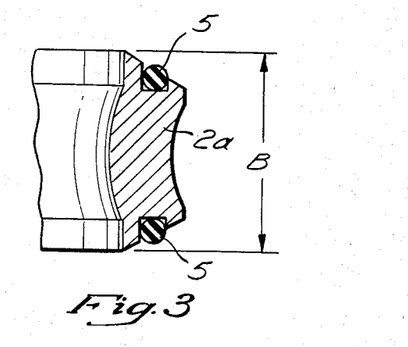
FIG. 3 is an elevational view in section, similar to FIG. 2, showing a cross-section of a sealing ring in its intermediate, deformed configuration.
Figure 4:
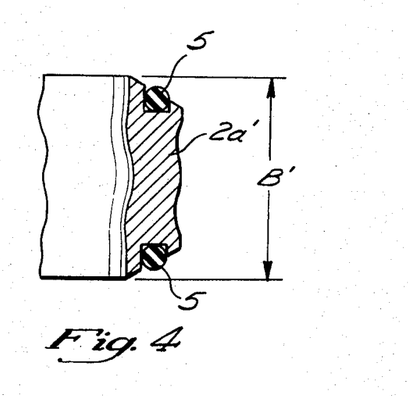
FIG. 4 is an elevational view in section, similar to FIGS. 2 and 3, showing a cross-section of a sealing ring in an alternate intermediate, deformed configuration.

The backup ring 2 shown in FIGS. 1 and 2, illustrates the "memory shape" chosen for the present invention, i.e., the form selected for the higher temperature phase. In contrast, the backup ring 2a shown in FIGS. 3 and 4, has been deformed and is in its "intermediate shape". (The "intermediate shape" will be hereinafter indicated by the addition of an "a" to the reference numeral indentifying that same structure when in its "memory shape".) As is shown by FIGS. 3 and 4, the precise nature of the deformation is not important, it can be a simple radial, inward distortion illustrated by FIG. 3, or the more complex ripple shown in FIG. 4. The only critical characteristic of the deformation is that the axial length B,B¹ after distortion of the backup ring 2a, 2a¹ must be less than axial length A of the backup ring 1 in its memory shape. The difference between A and B,B¹ can be on the order of 8% to 10%, however, in all cases it must be sufficient to avoid abrasive contact of the compliant seal 5 and the end faces 3 with their mating surfaces during the mechanical makeup of the connection.

Figure 5:
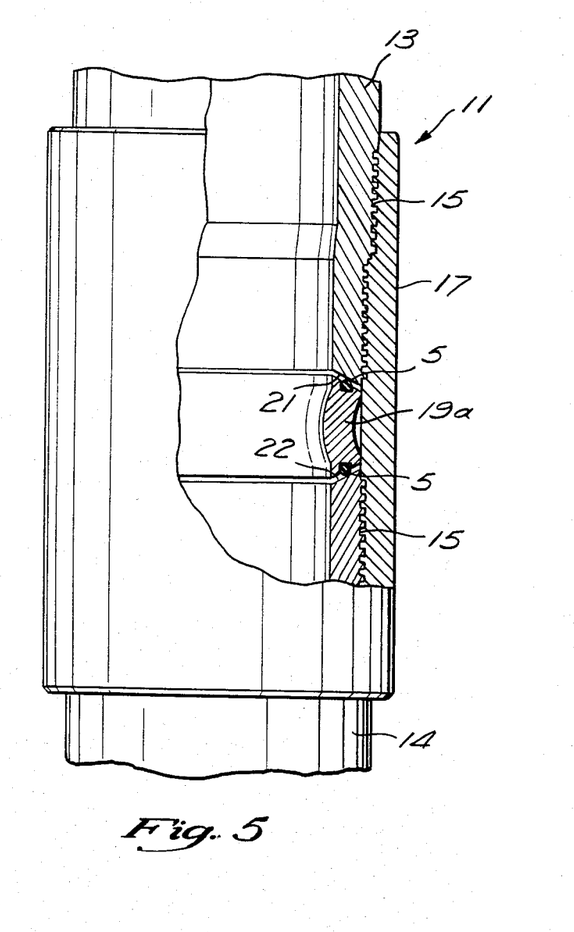
FIG. 5 is an elevational view with portions broken away and partially in section, showing a coupled con

In FIG. 5, a sealing ring 19a, in its intermediate configuration, has been installed in a coupled connection 11. The coupled connection 11, aside from the sealing ring 19a, consists of an upper tubular member 13 and a lower tubular member 14 received by an outer cylindrical sleeve 17. The tubular members 13,14 are retained within the cylindrical sleeve 17 by threads 15, formed on both the sleeve 17 and the tubular members 13,14. In the coupled connection 11 shown in FIG. 5, both of the tubular members 13,14 have been fully tightened onto the cylindrical sleeve 17. Adjacent the sealing ring 19a, the tubular members 13,14 are provided with an upper sealing surface 21 and a lower sealing surface 22, respectively.

Figure 6:
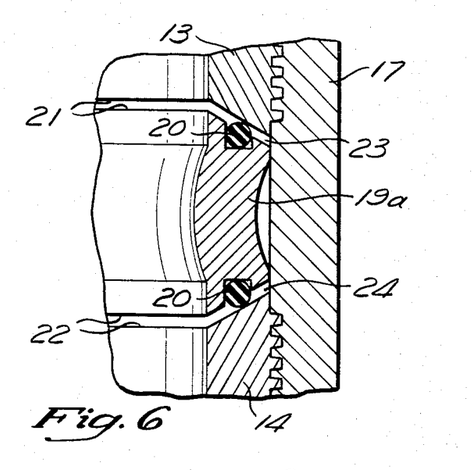
- FIG. 6 is an enlarged sectional view of the sealing ring illustrated in FIG. 5, showing the sealing surfaces in the connection.

As is more clearly shown in FIG. 6, the sealing ring 19a is not in compression as between the upper member 13 and the lower member 14. An upper gap 23 separates the upper sealing surfaces while a lower gap 24 separates the lower sealing surfaces 22. When placed in a vertical installation, the end face 3 of the sealing ring 19a will rest upon the lower sealing surface 22 of the lower tubular member 14. However, the mechanical connection between the lower tubular member 14 and the outer cylindrical sleeve 17 has previously been completed, and thus after installation of the sealing ring 19a, relative motion will only occur between the end face 3 of the sealing ring 19a and the upper sealing surface 21 of the upper tubular member 13, which are separated by the upper gap 23. The presence of either or both the upper and lower gaps 23,24 between sealing surfaces in relative motion assures that the sealing ring 19a and the upper and lower sealing surfaces 21,22 will not be damaged during the mechanical makeup of the coupled connection 11.

Figure 7:
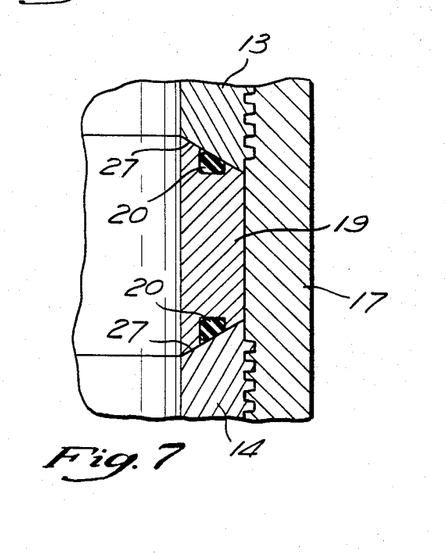
FIG. 7 is an enlarged sectional view similar to FIG. 6, showing the sealing ring in final, memory shape configuration.

Upon the application of heat energy to the sealing ring 19a, the Nitinol backup ring 2 will change crystaline phases, and attempt to reassume its memory shape. FIG. 7 illustrates the results of such a transformation. The upper and lower gaps 23,24 no longer exist as the sealing ring 19 occupies the entire space between the upper and lower tubular members 13,14. A compliant seal 20 is shown pressed between a zero-clearance backup and secondary seal 27. The backup/seal 27 prevents the complaint seal 20 from extruding out of the grooves 4 when subjected to high temperature and pressure conditions. The actual material utilized to make up the compliant seal 20 may consist of any compliant seal material known to the art, such as polyfluoroolefin resins such as Teflon, various elastomeric materials, and even soft metals. The principal design criteria is the ability of such material to retain its integrity and flexibility under the harsh, high temperature and pressure conditions to which it will be subjected. A present preferred material is a known elastomeric material, Y267 EPDM, (ethelyne propylene diene methylene), which may be obtained from Precision Rubber Company, Lebanon, Tenn.

The dimensional configuration of the backup/sealing ring 19 while in its memory shape, is carefully designed to obtain a backup/seal with the desired design characteristics. The characteristics of Nitinol provide a precise control of the extent of the backup ring 2 expansion. The 8-10% of expansion available from Nitinol must also take into account dimensional changes in the connection due to the influences of pressure and temperature. in addition to stretching of the connection caused by various forces, including the weight of the string of tubing already in the well hole. Presently, it is believed that the maximum possible stretch in the connection is approximately 3 mils, or about 0.3%. By tailoring the cross section of the sealing ring, the force applied to the adjacent tubular members 13,14 can be controlled, and thus overstressing of the joint can be prevented, while concurrently providing a slack take-up capability of the sealing ring 19 on the order of two to three percent—well in excess of the 0.3% due to stretching. Thus, the seal is maintained notwithstanding the dimensional changes in the joint due to temperature and pressure variations and other outside forces being applied to the joint.

Figure 8:
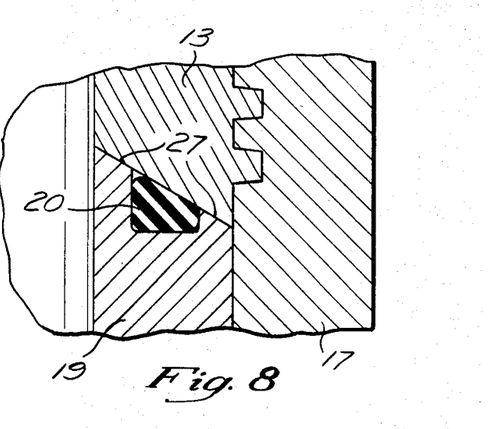
FIG. 8 is an enlarged sectional view showing the sealing surfaces and zero clearance backup created upon formation of the seal.

The actual interface between the sealing ring 19 and the tubular member 13 is clearly shown in FIG. 8. The compliant seal 20 is shown between zero clearance backup/seals 27. The backup/seals 27 consist of the metal-to-metal backup/seal formed by the end faces 3 of the metal ring 2 abutting the sealing surface 21 of the tubular member 13. The ability to create both the compliant seal 20 and the backup/seal 27 after the coupled connection 11 has been mechanically completed, greatly simplifies design of the connection. The sealing surfaces are no longer subjected to the high abrasive forces created as the connection is being made. Instead, the seal shown in FIG. 8 possess sealing surfaces that were essentially not in sliding contact prior to the transition of the Nitinol from its intermediate shape to its memory shape.

Figure 9:
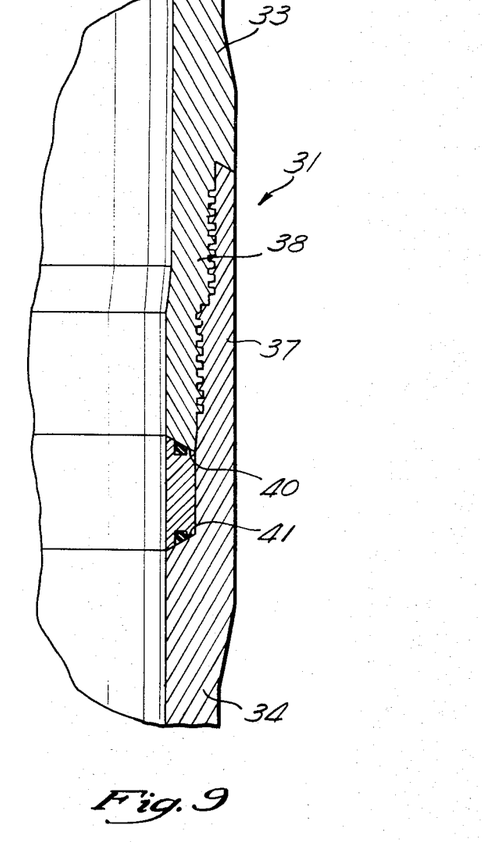
FIG. 9 is an elevational view with portions broken away and partially in section, showing an upset joint connection between tubular members, having a sealing ring in place between the male and female joint connection.

This inventive shape memory seal may be utilized in a wide variety of tubular joints. FIG. 9 illustrates its use in connection with a box-pin upset tubular joint 31, so known due to the increase in outer diameter of the tubular member about the joint. In the upset joint connection 31, an upper tubular member 33 having a pin or male end portion 38, is received by a box or female end portion 39 formed in the lower tubular member 34. A sealing ring 39 is received between a tip 40 of the pin end portion 38 and a base 41 of the box end portion 37. As was the case in the coupled connection 11, a seal is formed in the upset joint connection 31 only after the joint is mechanically complete.

Figure 10:
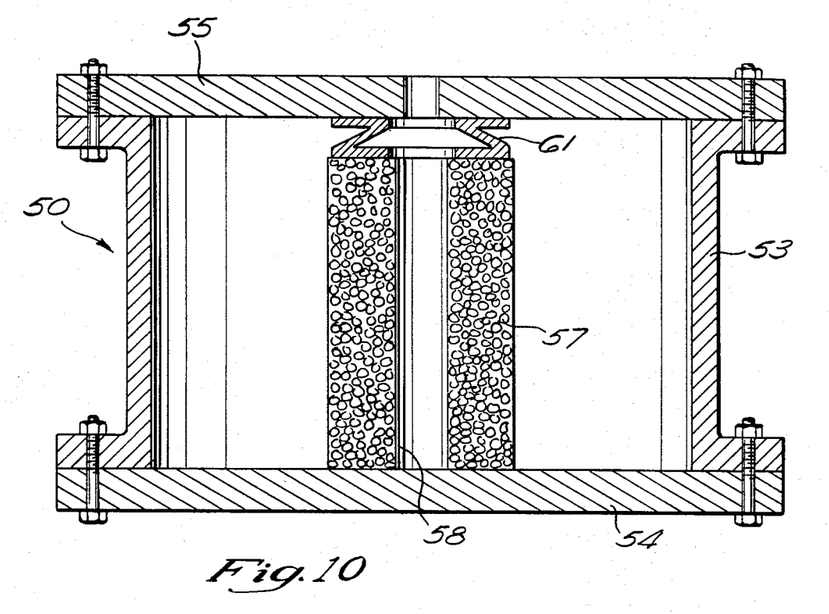
FIG. 10 is an elevational view in section showing a rock core pressure testing vessel utilizing an embodiment of the present invention.
Figure 11:
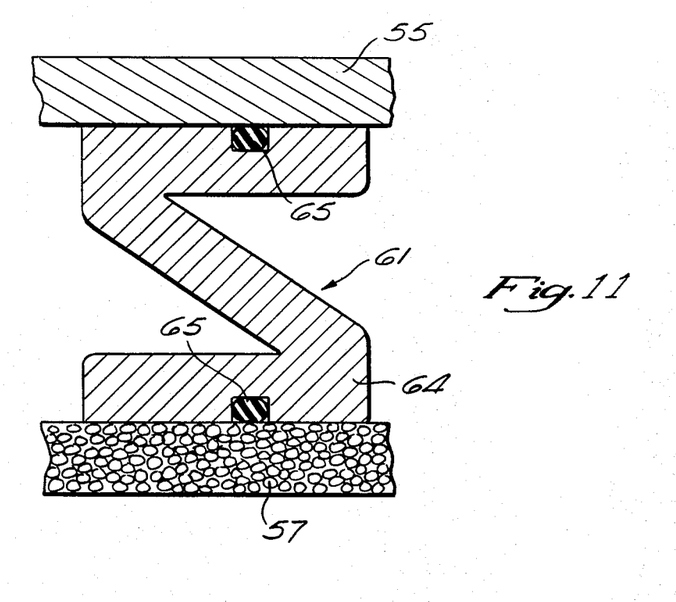
FIG. 11 is an enlarged sectional view showing the sealing member as positioned between the rock core and upper closing flange of the pressure testing vessel shown in FIG. 10.

FIG. 10 illustrates the utilization of the shape memory seal in conjunction with a rock core pressure testing vessel 50. The testing vessel 50 is frequently used for geothermal and oil and gas formation permeability testing. The testing vessel 50 consists of an outer cylindrical pressure vessel 53 with a bottom closing flange 54 and an upper closing flange 55. A cylindrical rock core 57 having a center bore 58 is placed inside of the pressure vessel 53. A disc-shaped sealing system 61, Z-shaped in cross-section, of shape memory material provides the seal between the top of the rock core 57 and the closing flange 55. The bottom of the rock core 57 can easily be firmly attached to the bottom flange 54; however, surface irregularities in the rock core 57 and variations in overall size invariably produce irregular gaps between the rock core 57 and the upper flange 55. Upon activation to its memory shape, the seal system 61 exerts upward pressure against the closing flange 55 forming a pressure tight seal, thus permitting the creation of a pressure differential between the center bore 58 and the space surrounding the rock core 57 within the pressure vessel 53. FIG. 11 illustrates the analogous utilization of a shape memory member 64 in conjunction with a compliant material 65 in the disc-shaped sealing system 61.

Regardless of the type of tubing connection involved, the method for effecting this inventive seal is the same. Where a separate coupling member is to be utilized, for example a cylindrical sleeve, the separate member is first attached to the lower tubular member. The Nitinol ring seal in its intermediate shape is then placed either in the coupling portion of the lower tubular member or on top of the lower member when it is attached to a separate coupling member. In either case, the upper tubular member is then attached. It is only after the connection has been mechanically completed that the Nitinol ring is returned to its memory shape by the application of heat, which may be applied by any method, for example, by combustion of oil or gas, or induction heating. In a preferred method, since oil drilling rigs are normally provided with a steam generator, and by adjusting the components of the Nitinol alloy in a manner well known to the art, it is possible to select an alloy such that steam could be used to effect the crystaline structure transition.

Upon the application of heat, the tubular joint is completed. Even where the temperature falls below the memory shape crystaline phase temperature, the seal is maintained but at a lower stress. Upon subjecting the joint to its high pressure and temperature environment, phase transition and higher stresses are again achieved. Independently, the seal is self-energized into its correct, designed configuration by the pressure within the tubular. Disassembly is no problem and upon the simple refurbishing, the seal may be reused any number of times without losing its ability to reassume its memory shape.

While we have disclosed exemplary structures and methods of construction to illustrate the principles of the present invention, it should be understood that we wish to embody within the scope of the patent warranted hereon, all such modifications as reasonably and properly come within the scope of our contribution to the art.

We claims:

1. A tubular joint sealing member that is selectively energized and seated after the mechanical makeup of the joint comprising:
   a shape memory material backup member having at least one sealing surface thereon and a memory shape of sufficient dimension to form a seal in a tubular joint with an initial intermediate shape of insufficient dimensions therefor; and
   a ridge of compliant sealing material located on every sealing surface, whereby activation at a selected time causes the shape memory material in its intermediate shape to assume its memory shape, seating the seal and the sealing surface on said shape memory material backup member provides a backup adjacent the compliant sealing material.

2. A tubular joint sealing member as described in claim 1, wherein the backup member comprises an alloy of Nickel and Titanium formed into a ring, and is provided with two sealing surfaces.

3. A tubular joint sealing member as described in claim 2, wherein the compliant sealing material is formed in a groove that is centrally located, circumferentially about each sealing surface.

4. A tubular joint sealing member as described in claim 1, wherein the compliant sealing material is selected from the group consisting of polyfluorooelefin resins, elastomeric compounds, and soft metal sealing compounds and wherein the shape memory material is selected from the group consisting of 55-Nitinol and a family of shape memory brasses.

5. In a tubular sealed connection for high temperature and pressure applications of the type consisting of a first and second tubular member mechanically joined together in a gas and fluid-tight sealed relationship wherein the improvement comprises:
a sealing member formed of a shape memory material having an intermediate and a memory shape, and provided with at least one sealing surface; and
a ridge of compliant sealing material located on every sealing surface of said sealing member whereby the shape memory material enables selective activation and seating of the sealing member after the mechanical makeup of the connection and the sealing surface of said shape memory material backup member provides a backup adjacent the compliant sealing material.

6. A tubular sealed connection as described in claim 5, wherein said ridge of compliant sealing material is centrally formed on every sealing surface.

7. A tubular sealed connection as described in claim 5, wherein said shape memory material comprises an alloy of Nickel and Titanium.

8. A coupled tubular sealed connection for high temperature and pressure applications comprising:
an outer cylindrical sleeve having a plurality of tubular member receiving threads provided on an interior wall thereof;
a first tubular member received within the sleeve by a first portion of the threads;
a second tubular member received within the sleeve by a second portion of the threads;
a sealing member received within the sleeve and located between the sealing surfaces of said first and second tubular members and further comprising:
a shape memory material member having an intermediate configuration and a shape memory configuration formed into a ring;
a sealing surface formed on each end face of said ring; and
a circumferential ridge of compliant sealing material located on each sealing surface, whereby heating the shape memory material ring at a selected time after the physical makeup of the connection causes activation of the ring to its shape memory configuration seating the seal, with the sealing surfaces of the shape memory material member and the adjacent sealing surfaces of the tubular members providing a metal-to-metal backup adjacent the compliant sealing material.

9. A coupled tubular sealed connection as described in claim 8, wherein said shape memory material is selected from the group consisting of an alloy of Nickel and Titanium and a family of shape memory brasses.

10. A coupled tubular sealed connection as described in claim 8, wherein said seal of compliant sealing material is centrally located on each sealing surface and said shape memory material ring provides a secondary metal-to-metal backup seal upon the selective activation of the ring.

11. A tubular sealed connection for high temperature and pressure applications comprising:
a first tubular member having a box connector portion formed on one end thereof;
a second tubular member having a pin connector portion formed on one end thereof, said pin connector portion received by the box connector portion of said first tubular member;
a sealing system received within the box connector portion between sealing surfaces formed on the first and second tubular members, said sealing system comprising:
a shape memory material backup member having an intermediate and a shape memory configuration, formed into a ring and having a sealing surface formed on each end face thereof; and
a circumferential ridge of compliant sealing material located on each sealing surface,
whereby a seating of the sealing system is caused to occur after the physical makeup of the connection by the selective activation of the ring to its shape memory configuration with the sealing surfaces of the shape memory material backup member and the adjacent sealing surfaces of the first and second tubular members providing a metal-to-metal backup adjacent the compliant sealing material.

12. A tubular sealed connection as described in claim 11, wherein a plurality of matching threads are provided in the box connector portion and on the pin connector portion of the first and second tubular members to effect a mechanical connection.

13. A tubular sealed connection as described in claim 11, wherein said shape memory material is selected from the group consisting of an alloy of Nickel and Titanium and a family of shape memory brasses.

14. An upset tubular sealed connection as described in claim 11, wherein said seal of compliant sealing material is centrally located on each sealing surface and said shape memory material backup member provides a secondary metal-to-metal backup seal upon the selective activation of the ring.

15. A method for providing a gas and fluid-tight seal for a joint comprising:
fabricating a backup member out of a shape memory material;
forming said backup member in a suitable memory shape to effect a sealing between sealing surfaces of the joint;
fabricating a sealing member out of a compliant material;
installing the sealing member on a sealing surface of the backup member in a manner whereby a continuous portion of the sealing surface remains exposed adjacent the installed sealing member;
deforming the backup member to an intermediate shape that provides clearance between the sealing surfaces of the backup member and the sealing surfaces of the completed joint;
placing the intermediate shape backup and sealing member assembly in the joint prior to the mechanical completion thereof;
completing the mechanical or structural formation of the joint; and
heating the intermediate shape backup member present in the completed joint sufficiently to cause transformation of the intermediate shape backup member to its memory shape, and thus formation of the seal whereby the exposed portion of the sealing surface forms a backup for the compliant sealing member.

16. A method for providing a gas and fluid-tight seal as described in claim 15 and further comprising:

forming at least one sealing surface on the shape memory backup member prior to deforming the backup member to the intermediate shape.

17. A method for providing a gas and fluid-tight seal as described in claim 15, wherein the compliant sealing member is installed after the backup member is deformed to said intermediate shape.

18. A joint sealing system that is selectively energized and seated after the mechanical makeup of the joint comprising:

a shape memory material backup member having at least one sealing surface providing a substantially zero clearance backup formed thereon, and having a memory shape of sufficient dimension to form a seal in a joint with an initial intermediate shape of insufficient dimensions to form such a seal; and a compliant sealing member installed in and projecting upwardly from the sealing surface, with the shape memory material of the sealing surface adjacent to the sealing member providing said backup, whereby activation at a selected time during the makeup of the joint connection causes the shape memory material to assume its memory shape from said initial intermediate shape, thus seating the sealing system with respect to a corresponding sealing surface formed on the member to be sealed.

19. A joint sealing system as described in claim 18, wherein the backup member comprises a shape memory alloy of Nickel and Titanium and is provided with two sealing surfaces.

20. A joint sealing system as described in claim 18, wherein the backup member comprises a shape memory alloy of a family of brasses and is provided with two sealing surfaces.

21. A joint sealing system as described in claim 19 or 20, wherein said backup member is formed into a ring and the compliant sealing material is placed on a groove that is located circumferentially about each sealing surface.

22. A joint sealing system as described in claim 18, wherein the compliant sealing member comprises a compliant material selected from the group consisting of plastic compounds, polyfluroolefin resins, elastomeric compounds, and soft metal sealing compounds.

23. A joint sealing system as described in claim 18, wherein said shape memory backup member provides a secondary metal-to-metal seal upon the seating of the sealing system.

24. In a sealed connection for high temperature and pressure applications of the type consisting of a first and a second member mechanically joined together in a gas and fluid-tight sealed relationship, wherein the improvement comprises:

a backup member formed of a shape memory material having an intermediate shape and a memory shape, and provided with at least one sealing surface; and a compliant sealing member installed on every sealing surface of said backup member, with the shape memory material of the sealing surface adjacent to the sealing member providing a metal-to-metal backup, whereby the shape memory material backup member allows for the selective activation and seating of the sealing system after the mechanical makeup of the connection.

25. A sealed connection as described in claim 24, wherein said compliant sealing member is centrally located on every sealing surface.

26. A sealed connection as described in claim 24, wherein the shape memory material is an alloy selected from the group consisting of 55-Nitinol and a family of shape memory brasses.

27. A sealed connection as described in claim 24, wherein said backup member provides a secondary metal-to-metal seal upon the seating of the sealing system.

28. A sealing system capable of being emplaced at selected time after mechanical makeup of a multiple member joint comprising:

a shape memory backup member having one or more sealing surfaces formed therein, said backup member provided with both a memory shape and an intermediate shape;

a compliant seal formed on every sealing surface of the shape memory backup member with the shape memory material of the sealing surface adjacent to the sealing member providing a metal-to-metal backup; and a sealing surface formed on one or more of the members of the joint and suitable for effecting a sealed engagement with one of said sealing surfaces formed on the backup member when the backup member is in said memory shape.

29. A sealing system as described in claim 28, wherein the sealing surfaces on the backup member and the joint member cooperate to form a zero clearance seal.

30. A sealing system as described in claim 29, wherein the seal is a metal-to-metal seal.

31. A sealing system as described in claim 28, wherein said memory shape is sized to provide a selected level of stress to the joint, whereby the seal is maintained notwithstanding dimensional changes in the joint caused by outside forces.

32. A sealing system as described in claim 28, wherein said backup member comprises a shape memory alloy selected from the group consisting of 55-Nitinol and a family of shape memory brasses.

33. A sealing system as described in claim 32, wherein the shape memory alloy permits activation of the backup member to the memory shape at a plurality of specific working environments for the joint.

34. A sealing system as described in claim 28, wherein the shape memory backup member is sized to permit the easy removal of the backup member and compliant seal from the joint upon the disassembly of the joint members.

35. A sealing system as described in claim 28, wherein said multiple member joint comprises a screwed connection.

36. A sealing system as described in claim 35, wherein the screwed connection is a coupled connection.

37. A sealing system as described in claim 35, wherein the screwed connection is a pin and box connection.

38. A joint sealing system that is selectively energized and seated after the mechanical make-up of the joint comprising:

a shape memory material member, having at least one sealing face formed thereon, with a resilient seal formed on said sealing face, and the shape memory material of the sealing surface adjacent to the sealing member providing a metal-to-metal backup, and having a memory shape of sufficient dimension to cause emplacement of the seal system when the shape memory material is heated beyond its transition temperature.

39. A joint sealing system as described in claim 38, wherein the sealing face forms a seal with its mating surface after implacement.

40. A joint sealing system as described in claim 38, wherein the shape memory material forms a zero clearance secondary seal after emplacement.

41. A joint sealing system that is selectively energized and seated after the mechanical makeup of the joint comprising:

- a shape memory material member having at least one sealing surface formed thereon and having a memory shape of sufficient dimension to form a seal in a joint with an initial intermediate shape of insufficient dimensions to form such a seal; and
- a compliant seal material received between a sealing surface formed on a member making up the joint and said adjacent sealing surface of the shape memory material member, said shape memory material member seating said compliant seal and providing lateral support to the compliant seal material upon activation to its memory shape, whereby the compliant sealing material obtains lateral support from the shape memory material, preventing seal failure due to extrusion of the resilient material from between the adjacent sealing surfaces under high pressures.

42. A joint sealing system as described in claim 41 wherein said joint comprises a tubular connection and said shape memory material member is formed into a ring having a sealing surface formed on each end face thereof.

43. A sealing system capable of being emplaced at a selected time after mechanical makeup of a multiple member joint comprising:

- a shape memory material member having a memory shape and an intermediate shape;
- a compliant seal material received between a pair of sealing surfaces forming said joint, said compliant seal material positioned to be compressed between said pair of surfaces when the shape memory material member changes from said intermediate shape to said memory shape; and
- a backup member adjacent the compliant seal providing lateral support to said compliant seal material upon activation of the shape memory material member from said intermediate shape to the memory shape, whereby activation of the shape memory material after the mechanical makeup of the multiple member joint seats both a compliant seal and a backup for the seal to prevent seal failure under high pressures.

44. A sealing system as described in claim 43, wherein the backup member comprises a sealing surface formed on the shape memory material member.

* * * * *